(12) United States Patent
Baldischweiler

(10) Patent No.: US 12,141,637 B2
(45) Date of Patent: Nov. 12, 2024

(54) METHOD FOR PRODUCING A CARD BODY, METHOD FOR PRODUCING A CHIP CARD, CARD BODY FOR A CHIP CARD AND CHIP CARD

(71) Applicant: GIESECKE+DEVRIENT MOBILE SECURITY GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/036,235

(22) PCT Filed: Nov. 17, 2021

(86) PCT No.: PCT/EP2021/025447
§ 371 (c)(1),
(2) Date: May 10, 2023

(87) PCT Pub. No.: WO2022/106059
PCT Pub. Date: May 27, 2022

(65) Prior Publication Data
US 2023/0409861 A1    Dec. 21, 2023

(30) Foreign Application Priority Data
Nov. 19, 2020    (DE) .................. 10 2020 007 089.2

(51) Int. Cl.
*G06K 19/02* (2006.01)
*G06K 19/077* (2006.01)

(52) U.S. Cl.
CPC .................. *G06K 19/07722* (2013.01); *G06K 19/07747* (2013.01); *G06K 19/07749* (2013.01)

(58) Field of Classification Search
CPC ....... G06K 19/07722; G06K 19/07749; G06K 19/077; G06K 19/07745; G06K 19/07;
(Continued)

(56) References Cited

U.S. PATENT DOCUMENTS 6,161,761 A * 12/2000 Ghaem .............. G06K 19/0775
343/866
6,581,839 B1 * 6/2003 Lasch .................... G06K 19/08
235/487

(Continued)

FOREIGN PATENT DOCUMENTS

JP    H1125244 A    1/1999

OTHER PUBLICATIONS

German Search Report from corresponding DE Patent Application No. DE102020007089.2, Jun. 2, 2021.
(Continued)

*Primary Examiner* — Daniel St. Cyr
(74) *Attorney, Agent, or Firm* — Workman Nydegger

(57) ABSTRACT

A method for producing a card body for a chip card, includes the steps of: providing a flat card body having a metallic core, wherein the metallic core is covered at least partly with a plastic layer at least on a main area and wherein the metallic core has a slit running from an outer edge of the main area into this main area; and incorporating a cavity having a bottom area for receiving a chip module into the plastic layer in such a way that the cavity covers the slit at least partly and that at least along the slit an excess material remains with respect to the bottom area.

22 Claims, 2 Drawing Sheets

(58) Field of Classification Search
CPC ........... G06K 19/06196; G06Q 20/341; G06Q 50/08; G06Q 20/352
USPC ........................................ 235/488, 487, 492
See application file for complete search history.

(56) References Cited

U.S. PATENT DOCUMENTS

| | | |
|---|---|---|
| 2005/0194452 A1* | 9/2005 | Nordentoft ........ G06Q 20/3415 235/492 |
| 2006/0124753 A1* | 6/2006 | Scholz ............. G06K 19/07749 235/492 |
| 2009/0294553 A1* | 12/2009 | Wang .................... A01M 29/12 239/135 |
| 2016/0110639 A1 | 4/2016 | Finn et al. |
| 2019/0114526 A1 | 4/2019 | Finn et al. |
| 2019/0286961 A1 | 9/2019 | Lowe |
| 2020/0065641 A1 | 2/2020 | Pachler et al. |
| 2020/0257953 A1 | 8/2020 | Lotya et al. |

OTHER PUBLICATIONS

International Search Report from corresponding PCT Application No. PCT/EP2021/025447, Feb. 4, 2022.

\* cited by examiner

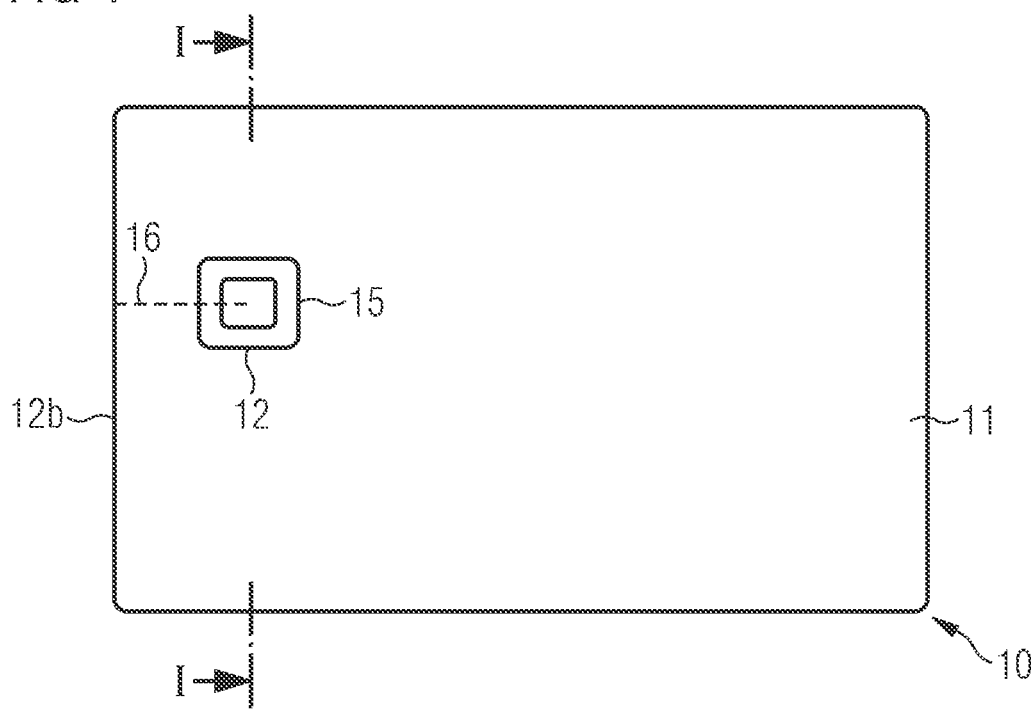
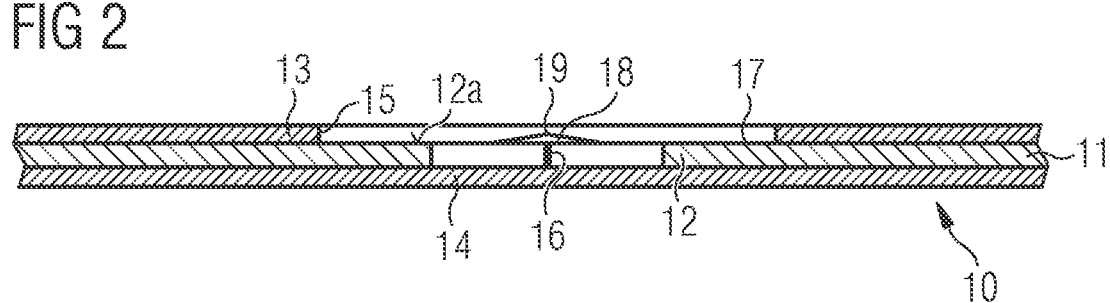
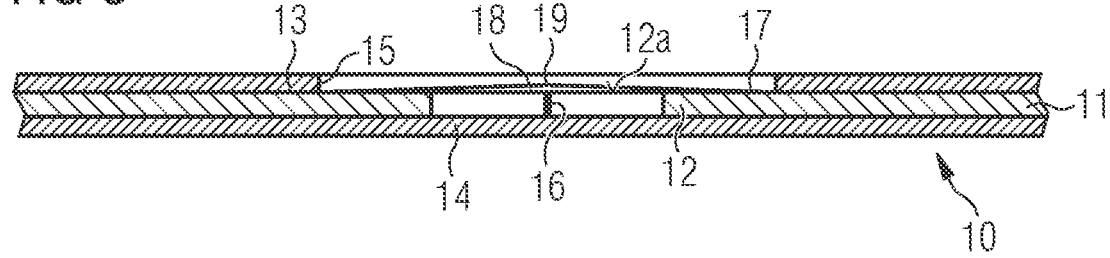

METHOD FOR PRODUCING A CARD BODY, METHOD FOR PRODUCING A CHIP CARD, CARD BODY FOR A CHIP CARD AND CHIP CARD

BACKGROUND

The invention relates to a method for producing a card body for a chip card, a method for producing a chip card, a card body for a chip card and to a chip card comprising a card body.

Card bodies having a metallic core in the form of a metallic core layer or a metallic core element are considered. The metallic core is furnished with a slit to prevent an electromagnetic short circuit. The short circuit can be caused, for example, by metal filings that enter the slit during its formation.

When producing such card bodies having a metallic core, the problem arises that the slit or gap used may be instable and that upon milling out the card the slit of the card fills with metal filings. The instability has the disadvantage that upon incorporating the chip module the slit is displaced to such a strong extent that a contacting of the two sides of the slit may be possible. Incorporated filings moreover can generate electrical short circuits in the metallic core. Such problems deteriorate the communication of the chip card.

SUMMARY

It is therefore the object of the present invention to reduce the risk of undesirable short circuits in card bodies or chip cards.

This object is achieved by a method for producing a card body for a chip card, a method for producing a chip card, a card body for a chip card and a chip card comprising a card body. Embodiments and developments of the invention are stated in the dependent claims.

A basic idea of the present invention is not to disembowel the cavity in the plastic layer of the card body down to the metallic core, as is usually the case, but to allow an excess material of the plastic layer to remain at least along the slit upon incorporating the cavity. For example, in a milling operation for creating the cavity, the region of the slit can be milled to a shallower depth so that the excess material stands out from the rest of the bottom area of the cavity. This excess material can, for example, be transferred into the slit upon inserting the chip module into the cavity. In doing so, any filings located in the slit are pressed out of the slit by the plastic material of the excess material or are encased by the plastic material. Likewise, a contacting of the side areas of the slit is prevented by the incorporated plastic material.

This has the advantage that electrical short circuits in the metal card are prevented. This in turn leads to an increased performance of the chip card, for example in an RFID communication, in IDC methods or cards with an additional inlay or cards where the module functions as a transmitter and receiver. Furthermore, the versatility of the card is increased, as this allows more distant service points or service points with special electrical requirements to be served.

Transferring the excess material into the slit can be effected simultaneously with inserting the chip module into the cavity or before inserting the chip module into the cavity. Advantageously, the excess material is completely transferred into the slit so that the chip module can be arranged in a plane fashion on the bottom area of the cavity. Otherwise, the same advantages and modifications as described above apply.

It may be provided that the excess material is pressed into the slit by the chip module or a stamp. The chip module can also be pressed or incorporated into the cavity with a stamp. Then the stamp engages the excess material indirectly via the chip module. Alternatively, a separate stamp such as a pre-stamp can be provided, which engages the excess material directly. This stamp may have a specially configured stamp head for pressing the excess material in a targeted fashion into the slit.

It may further be provided that upon transferring the excess material is heated and incorporated into the slit. Heating the plastic material of the excess material makes it flowable or at least easier to deform. This thermal transfer of the excess material into the slit can be effected purely through the heating and acting gravitational and/or capillary forces. Likewise, it is possible that the heating or warming of the excess material serves as a support for a mechanical transfer into the slit. The mechanical transfer of the excess material into the slit can be implemented by the chip module or a stamp, as described above.

It may be provided that the excess material is configured in a wedge shape such that a highest region of the wedge-shaped excess material is configured in the region of the slit. Such a wedge can be implemented very easily, for example, by a milling method. The highest region, the wedge tip so to speak, is defined relative to the bottom area of the cavity. An inclined area of the wedge, which extends from the tip of the wedge to the bottom area of the cavity, may extend over the entire extent of the cavity or only over a region of the bottom area of the cavity. Advantageously, the wedge-shaped region of the excess material has an angle of 45°. This ensures that all the material of the excess material is located in the region of the slit and can subsequently be transferred into it. The shape of the excess material is not restricted to a wedge, instead other shapes such as a rectangle, trapezoid or half cylinder are possible.

It may further be provided that the excess material is configured to have a height, with respect to the bottom area, in the range from 0.5 μm to 8 μm, preferably from 1 μm to 5 μm. It has been shown that for common chip card bodies according to ISO 7810, a such dimensioned excess material is well suited for transferring the excess material into the slit. For example, the slit can have a width between 30 μm and 100 μm, preferably between 50 μm and 80 μm. The height of the excess material can thus be, for example, approximately in the region of 0.01 to 0.1 times the width of the slit.

It may be provided that the volume of the excess material corresponds to the volume of the slit's region that is covered by the cavity. In other words, the volume of the excess material may correspond to the volume of the slit's region that is covered with the excess material. By means of the two identical volumes, it can be achieved that the slit is completely filled with the plastic material of the excess material. Alternatively, it may be provided that the volume of the excess material corresponds to 75% to 95% of the volume of the slit's region that is covered by the cavity. In this way, the incorporation of the excess material into the slit can be simplified so that no material remains on the bottom area after the incorporation of the excess material.

A card body for a chip card according to the invention comprises a metallic core which is covered at least partly with a plastic layer at least on a main area and which has a slit running from an outer edge of the area into this area, and a cavity in the plastic layer which covers the slit at least partly, wherein the cavity has a bottom area with an excess material, with respect to the bottom area, arranged at least along the slit. The same advantages and modifications as described before apply.

The card body usually has a flat base body consisting of a metallic core whose opposing main areas are usually completely covered with a plastic layer. The main areas of the metallic core can each be laminated or covered with a plastic layer. For example, the plastic layer may have a thickness of 5 μm to 10 μm and be made of a thermoplastic material, for example PC, PVC, PET, PETG or ABS.

In the region of one of the main areas, the cavity is incorporated in the plastic layer, one surface of the cavity having excess material with respect to the bottom area at least along the slit. The excess material is formed by the material of the plastic layer.

It may be provided that the excess material is configured in a wedge shape, with a highest region of the wedge-shaped excess material being configured in the region of the slit. Such a wedge can be produced very easily, for example, by a milling method. The highest region, the wedge tip so to speak, is defined relative to the bottom area of the cavity. An inclined area of the wedge, which extends from the tip of the wedge to the bottom area of the cavity, may extend over the entire extent of the cavity or only over a region of the bottom area of the cavity. Advantageously, the wedge-shaped region of the excess material has an angle of 45°. This ensures that all the material of the excess material is located in the region of the slit and can subsequently be transferred into it. The shape of the excess material is not restricted to a wedge, instead other shapes such as a rectangle, trapezoid or half cylinder are possible.

It may further be provided that the excess material is configured to have a height, with respect to the bottom area, in the region from 0.5 μm to 8 μm, preferably from 1 μm to 5 μm. It has been shown that for common chip card bodies according to ISO 7810, a such dimensioned excess material is well suited for transferring the excess material into the slit. For example, the slit can have a width between 30 μm and 100 μm, preferably between 50 μm and 80 μm. The height of the excess material can thus be, for example, approximately in the region of 0.01 to 0.1 times the width of the slit.

A chip card according to the invention comprises a card body as described above and a chip module embedded at least partly in the cavity of the card body. The same advantages and modifications as described before apply.

BRIEF DESCRIPTION OF THE DRAWINGS

The present invention will hereinafter be described by way of example with reference to the attached drawings.

FIG. 1: a plan view of a card body for a chip card;

FIG. 2: a sectional representation of the card body according to line I-I;

FIG. 3: a sectional representation of a further card body;

DETAILED DESCRIPTION OF VARIOUS EMBODIMENTS

Figure 4:
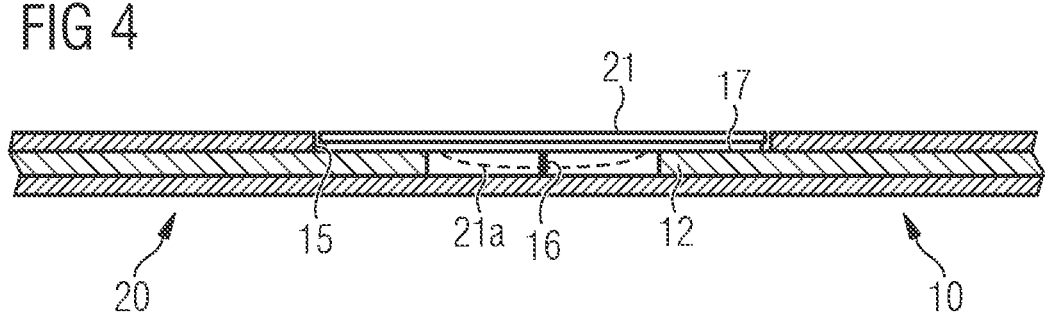
FIG. 4: a sectional representation of a chip card with card body and chip module.

FIG. 1 shows a card body 10 for a chip card with a base body 11 in which a metallic core 12 extends at least partly. As can be seen in FIG. 2, the metallic core 12 is covered with a plastic layer 13 on one of its two main areas 12a. The opposite main area is also covered with a further plastic layer 14. The two plastic layers 13 and 14 can be laminated, for example.

In the partial sectional representation of FIG. 2, the metallic core 12 is represented as a continuous layer. Alternatively, the metallic core 12 can be configured locally limited so that the metallic core 12 then does not extend over the entire length and/or width of the card body 10. Thus, the metallic core 12 may extend completely inside the card body 10. In this case, an outer edge 12b of the metallic core 12, which runs around the main area 12a, may be covered by a further plastic layer or the plastic layers 13,14. In this way, the metallic core 12 is completely encased in plastic and not visible.

In the region of the main area 12a of the metallic core 12, a cavity 15 is configured into which a chip module of the chip card can be inserted. The cavity 15 is recessed in the plastic layer 13 and is created, for example, by means of a laser operation or milling operation.

From the outer edge 12b of the metallic core 12 there extends a slit 16 to the cavity 15, for example to the center of the cavity 15. For example, the slit 16 has a width between 30 μm and 100 μm, preferably between 50 μm and 80 μm. The slit 16 serves to prevent eddy currents in the vicinity of the cavity 15 and is therefore configured in the metallic core 12. The slit 16 is usually configured in the metallic core 12 before the latter is laminated with the plastic layers 13 and 14.

The thickness of the card body 10 should not exceed the maximum thickness of a chip card body according to ISO 7810.

The thickness of the plastic layer 13 is defined from the main area 12a to an exterior surface of the plastic layer 13. The cavity 15 is configured in the plastic layer 13 to a depth which corresponds to the main area 12a of the metallic core 12. In other words, the height of the cavity extends from the main area 12a of the metallic core to the exterior surface of the card body 10. A bottom area 17 of the cavity 15 is formed by the main area 12a of the metallic core 12.

From this bottom area 17 of the cavity 15, excess material 18 stands out in the region of the slit 16. This excess material 18 is preferably a remainder of the plastic layer 13 intentionally remaining during the production of the cavity 15. When creating the cavity 15, excess material 18 is left over in a central region around the slit 16 so that it can be incorporated into the slit 16 in a later step.

The excess material 18 may be configured in a wedge shape as represented in this example, so that a highest region 19 or a tip of the wedge-shaped region is configured in the region of the slit 16 or directly above the slit 16. The height of the excess material 18 with respect to the bottom area 17 may be in a range from 0.5 μm to 8 μm, preferably from 1 μm to 5 μm.

The dimensions of the excess material 18 in a length in the direction of the slit 16, in a width perpendicular to the slit 16 and in the height with respect to the bottom area 17 determine the volume of the excess material 18. The volume of the excess material 18 may be dimensioned such that it corresponds to the volume in the region of the slit 16 that is covered by the cavity 15. In this way, the material of the excess material 18 can be easily transferred directly to the part of the slit 16 located immediately below. Alternatively, it may be provided that the volume of the excess material 18 corresponds to the volume of the entire slit 16, i.e. including that part of the slit 16 which additionally extends beyond the cavity 15. In this way, a larger part of the slit 16 can be filled. In particular, in all the variants described, it may be advantageous to warm the excess material 18 upon transferring the excess material 18 into the slit 16 so that it becomes more easily deformable or flowable.

In the example of FIG. 2, the excess material 18 extends in its width only over a region in the immediate vicinity of the slit 16. But the highest region 19 of the wedge-shaped excess material 18 has a greater height. This configuration of the excess material 18 can be advantageous when the excess material 18 is transferred into the slit 16 with a pre-stamp specially configured for this purpose, before the chip module is inserted into the card body 10. Such a pre-stamp may have a stamp head which is adapted to the respective shape of the excess material 18 in order to transfer it as completely as possible into the slit 16, and which can be heated.

FIG. 3 represents a further example of excess material 18 in the cavity 15 of a card body 10. In this example, the wedge-shaped excess material 18 extends in its width over the entire main area 12a of the metallic core 12. The highest region 19 of the wedge-shaped excess material 18 is lower compared to the excess material 18 represented in FIG. 2. In this way, a similar volume of excess material 18 is set as in FIG. 2.

The volume of the excess material 18 of FIG. 3 can thus correspond to the volume of the excess material 18 as represented in FIG. 2. The volume of the excess material 18 is dimensioned according to which volume of the slit 16 is to be filled. For the slit's 16 volume to be filled it is decisive how wide and high the slit 16 is and to which length or filling degree the slit 16 is to be filled. The slit 16 can then be filled at least partly by the material or the plastic mass of the excess material 18.

FIG. 4 shows a cross-sectional view of a chip card 20, for example in the form of a contactless or dual interface chip card. The chip card 20 comprises a card body 10 as previously described and a chip module 21 embedded in the cavity 15. For example, the chip module 21 is fixed in the cavity 15 with an adhesive. The chip module 21 comprises a chip, preferably an RFID chip or an NFC chip, and an antenna coil coupled to the chip, preferably an inductively coupling antenna coil with at least one turn. The chip 21a, potted in a potting material, of the chip module 21 projects into the deep part of the cavity 15.

The chip module 21 rests on the bottom area 17 of the cavity 15 and thus on the main area 12a of the metallic core 12. The chip module may rest in a plane fashion or over the full area on the bottom area 17 of the cavity 15. This is possible because during the production of the chip card 20, the excess material 18, such as that represented in FIGS. 2 and 3, has been transferred into the slit 16. This means that when the chip card 20 is finished, as represented by way of example in FIG. 4, there is no more material of the excess material 18 on the bottom area 17 of the cavity 15. At least the major part of the excess material 18, for example more than 90% of the excess material, has been transferred into the slit 16.

The material in the slit 16 of the metallic core 12 then prevents short circuits between the side regions of the slit 16 completely or at least to a considerable extent. At the same time, due to the material in the slit 16, the stability of the card body 10 or of the chip card 20 is increased.

Figure 5:
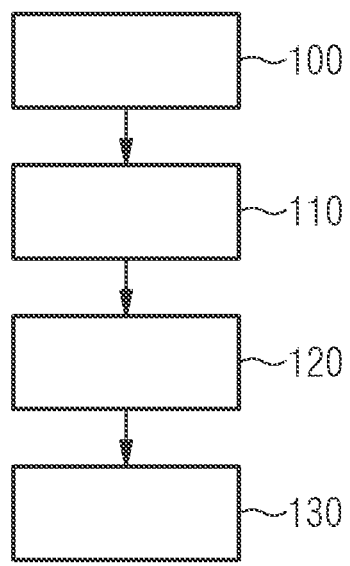
FIG. 5: a schematic representation of a method for producing a card body or a chip card.

With reference to FIG. 5, a method for producing a card body for a chip card, or a method for producing a chip card having a card body and a chip module at least partly embedded in the card body, is now described.

In a first step 100, a flat card body having a metallic core is supplied. At least on one main area of the metallic core or of the card body, the metallic core is covered at least partly with a plastic layer. Preferably, the metallic core is completely covered with a plastic layer on both main areas of the card body. Furthermore, the metallic core has a slit running from an outer edge of the main area into this main area.

The card body can, for example, be produced in such a way that first a sheet for a plurality of metallic cores is supplied, and in this sheet the slots for the respective metallic cores are lasered or stamped, for example. Subsequently, the two main areas of the sheet are laminated with a plastic layer. Then the individual card bodies are milled or punched out of the sheet. In this way, the card body can be produced.

In a second step 110, a cavity for receiving a chip module is incorporated into the plastic layer in such a way that the cavity covers the slit at least partly. The cavity is incorporated as deep as to a bottom area of the cavity in such a way that an excess material remains with respect to the bottom area at least along the slit. For example, the bottom area of the cavity is milled in a wedge shape so that a highest region of the wedge-shaped excess material is formed in the region of the slit.

By means of this method, a card body for a chip card can be produced, which during further production of the chip card allows the excess material to be transferred into the slit. Such a card body 10 for a chip card is shown by way of example in FIGS. 1, 2 and 3.

With the help of two further steps 120 and 130, it is described how a chip card is produced from the card body. The entire method for producing the chip card comprises steps 100 to 130.

In step 120, the excess material is transferred into the slit. This can be effected by the chip module, on the one hand, which is pressed or pushed into the cavity by a stamp or a similar device. During this operation, the chip module contacts the material of the excess material located at the bottom of the cavity, thereby pressing it into the slit of the metallic core. On the other hand, the excess material can be transferred directly into the slit, for example via a pre-stamp.

Heating or warming the excess material can be made, e.g. by heating the pre-stamp. In this way, the material of the excess material becomes softer or more flowable, so that the transfer of the excess material into the slit is supported.

In step 130, the chip module is inserted into the cavity until it reaches the bottom area of the cavity. An adhesive can be utilized which fixes the chip module in the cavity.

The two steps of transferring the excess material 120 and inserting the chip module 130 can be executed simultaneously or in one motion. Thus, during the insertion of the chip module into the cavity, the excess material can be transferred into the slit of the metallic core, so that at the end of this motion the chip module is completely inserted into the cavity.

By means of this method, a chip card having a card body can be produced, as represented by way of example in FIG. 4.

The step 120 of transferring the excess material into the slit can optionally also be made in the method for producing a card body for a chip card. The card body produced with this method has then already transferred the excess material into the slit. For the further production of the complete chip card, only step 130 is then required.

The intentional provision of the excess material at the bottom area of the cavity has the advantage that the material of the excess material is thus transferred into the slit of the metallic core before or during the insertion of the chip module into the cavity. The material in the slit of the metallic core then prevents short circuits between the side regions of the slit completely or at least to a considerable extent.

The invention claimed is:

1. A method for producing a card body for a chip card, the method comprising the steps of:
   providing a flat card body having a metallic core,
      wherein the metallic core is covered at least partly with a plastic layer at least on a main area of the metallic core, and
      wherein the metallic core has a slit running from an outer edge of the main area of the metallic core into the main area of the metallic core; and
   forming a cavity in the plastic layer by removing a portion of the plastic layer such that the cavity at least partly covers the slit of the metallic core, the cavity having a bottom area for receiving a chip module into the plastic layer,
      wherein forming the cavity in the plastic layer includes leaving a remaining portion of the plastic player at at least a portion of the bottom area at least along the slit as excess material.

2. The method according to claim 1, wherein the excess material is configured in a wedge shape in such a way that a highest region of the wedge-shaped excess material is configured in the region of the slit.

3. The method according to claim 1, wherein the excess material is configured to a height with respect to the bottom area in the region from 0.5 µm to 8 µm.

4. The method according to claim 1, wherein the volume of the excess material corresponds to the volume of the region of the slit which is covered by the cavity.

5. The method according to claim 1, wherein the metallic core is completely covered with the plastic layer.

6. The method according to claim 1, wherein the remaining portion of the plastic layer left as excess material after forming the cavity in the plastic layer extends along an entire length of the slit.

7. The method according to claim 1, wherein the cavity is formed in the plastic layer by a laser operation.

8. The method according to claim 1, wherein the cavity is formed in the plastic layer by a milling operation.

9. The method for producing a chip card having a card body and a chip module embedded at least partly in the card body, the method comprising the steps of:
   providing a flat card body having a metallic core,
      wherein the metallic core is covered at least partly with a plastic layer at least on a main area of the metallic core, and
      wherein the metallic core has a slit running from an outer edge of the main area of the metallic core into the main area of the metallic core;
   forming a cavity in the plastic layer by removing a portion of the plastic layer such that the cavity at least partly covers the slit of the metallic core, the cavity having a bottom area for receiving the chip module into the plastic layer
      wherein forming the cavity in the plastic layer includes leaving a remaining portion of the plastic player at at least a portion of the bottom area at least along the slit as excess material;
   transferring the excess material into the slit; and
   inserting the chip module into the cavity.

10. The method according to claim 9, wherein the excess material is pressed into the slit by the chip module or a stamp.

11. The method according to claim 9, wherein transferring the excess material into the slit includes heating and the excess material and incorporating the excess material into the slit.

12. The method according to claim 9, wherein, after the step of forming the cavity, the excess material is configured in a wedge shape in such a way that a highest region of the wedge-shaped excess material is configured in the region of the slit.

13. The method according to claim 9, wherein, after the step of forming the cavity, the excess material is configured to a height with respect to the bottom area in the region from 0.5 µm to 8 µm.

14. The method according to claim 9, wherein, after the step of forming the cavity, the volume of the excess material corresponds to the volume of the region of the slit which is covered by the cavity.

15. The method according to claim 9, wherein inserting the chip module into the cavity includes potting the chip module in a potting material within the cavity.

16. A card body for a chip card, the card body comprising:
   a metallic core; and
   a plastic layer covering at least partly a main area of the metallic core,
      wherein the metallic core has a slit running from an outer edge of the metallic core of the main area of the metallic core into the main area of the metallic core,
      wherein the plastic layer defines a cavity formed therein by removing a portion of the plastic layer such that the cavity at least partly covers the slit of the metallic core,
      wherein the cavity formed in the plastic layer has a bottom area with a remaining portion of the plastic player left at at least a portion of the bottom area at least along the slit as excess material.

17. The card body according to claim 16, wherein the excess material is configured in a wedge shape,
      wherein a highest region of the wedge-shaped excess material is configured in the region of the slit.

18. The card body according to claim 16, wherein the excess material is configured to a height with respect to the bottom area in the region from 0.5 µm to 8 µm.

19. A chip card comprising a card body according to claim 16 and a chip module inserted at least partly in the cavity of the card body.

20. The card body according to claim 16, wherein the volume of the excess material corresponds to the volume of the region of the slit which is covered by the cavity.

21. The card body according to claim 16, wherein the slit 16 has a width between 30 µm and 100 µm.

22. The chip card according to claim 19, wherein the chip module is potted in a potting material within the cavity.

* * * * *